(12) United States Patent
Davis

(10) Patent No.: US 6,419,966 B1
(45) Date of Patent: Jul. 16, 2002

(54) POLYETHYLENE ARTICLES WITH IMPROVED RESISTANCE TO WATER VAPOR TRANSMISSION

(75) Inventor: Donna Sue Davis, Baytown, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 08/362,042

(22) Filed: Dec. 22, 1994

(51) Int. Cl.$^7$ .............................................. B65D 85/00
(52) U.S. Cl. ..................... 426/106; 426/127; 426/415
(58) Field of Search ....................... 426/106, 415, 426/127, 130; 526/352

(56) References Cited

U.S. PATENT DOCUMENTS

| | | | |
|---|---|---|---|
| 3,645,992 A | 2/1972 | Elston et al. | 260/80.78 |
| 4,405,774 A | 9/1983 | Miwa et al. | 526/348.2 |
| 4,501,798 A * | 2/1985 | Koschak et al. | 428/349 |
| 4,668,752 A | 5/1987 | Tominari et al. | 526/348.2 |
| 4,833,111 A * | 5/1989 | Nowlin | 502/107 |
| 4,870,122 A | 9/1989 | Lu | 524/488 |
| 5,043,204 A | 8/1991 | Itaba et al. | 428/213 |
| 5,055,438 A | 10/1991 | Canich | 502/117 |
| 5,084,534 A | 1/1992 | Welborn, Jr. et al. | 526/160 |
| 5,089,308 A * | 2/1992 | Nordness et al. | 426/35.4 |
| 5,153,039 A | 10/1992 | Porter et al. | 428/36.92 |
| 5,155,160 A | 10/1992 | Yeh et al. | 524/487 |
| 5,227,440 A | 7/1993 | Canich et al. | 526/129 |
| 5,272,236 A | 12/1993 | Lai et al. | 526/348.5 |
| 5,360,648 A * | 11/1994 | Falla et al. | 428/35.2 |
| 5,382,630 A * | 1/1995 | Stehling et al. | 525/240 |
| 5,444,145 A | 8/1995 | Brant et al. | 526/348.3 |
| 5,539,124 A | 7/1996 | Etherton et al. | 548/402 |
| 5,562,874 A | 10/1996 | Saad et al. | 264/177.14 |
| 5,770,287 A | 6/1998 | Miranda et al. | 428/40.1 |
| 6,042,913 A | 3/2000 | Miranda et al. | 428/40.1 |

FOREIGN PATENT DOCUMENTS

| | | |
|---|---|---|
| EP | 0 310 290 A1 | 4/1989 |
| EP | 0 319 258 A2 | 6/1989 |
| EP | 0 341 188 A2 | 11/1989 |
| EP | 0 487 749 A1 | 6/1992 |
| EP | 0 539 047 A1 | 4/1993 |
| GB | 1101950 | 2/1968 |
| WO | WO 95/02630 | 1/1995 |

OTHER PUBLICATIONS

Bakker Et Al. "Encyclopedia Of Packaging Technology" 1986 p. 313–314.*

* cited by examiner

*Primary Examiner*—Lien Tran
(74) *Attorney, Agent, or Firm*—Stephen D. Prodnuk

(57) ABSTRACT

Films, containers made of high density polyethylene, and articles made therefrom exhibit, for a given density, improved resistance to water vapor transmission. The high density polyethylenes are produced in a metallocene-catalyzed production process. Alternatively, for equivalent water vapor transmission rates (WVTR) an article formed in accordance with the invention will exhibit improved physical properties, such as dart drop impact, more balanced tear properties and improved machine direction (MD) tear properties. Additionally, these high density polyethylenes show a low level of extractables and an excellent organoleptic profile.

10 Claims, 1 Drawing Sheet

POLYETHYLENE ARTICLES WITH IMPROVED RESISTANCE TO WATER VAPOR TRANSMISSION

FIELD OF THE INVENTION

This invention relates generally to films and containers made from high density polyethylene. More specifically this invention is directed toward films and containers having low water vapor transmission rates, while maintaining better physical properties than films or containers fabricated with materials having similar water vapor transmission rates.

BACKGROUND OF THE INVENTION

Polyolefins have been used as packaging materials for several decades. Among the properties provided by polyolefin packaging materials are durability, case of machineability, protection of packaged contents, and printability.

In the segment of the market where polyolefin based packaged products are used for protection, there are several types of protection sought depending upon the products packaged, their desired shelf life, and the environment to which the packages and their contents are to be subjected. One of the key elements that a polyolefin protective package (or a package including a polyolefin) can provide is a resistance to moisture or water vapor transmission. This resistance can either keep moisture away from packaged contents or alternatively keep moisture in packaged contents. In either case, generally, the higher the water vapor transmission resistance per unit of film or container thickness, the more economical the package.

One of the most common polyolefin polymers valued for its moisture or water vapor transmission rate (WVTR) is high density polyethylene (HDPE). Generally HDPEs are those which have densities at or above about 0.940 g/cc. Generally, the higher the density, the better a resin's WVTR for a given package thickness. However, as with many such physical properties, there are tradeoffs, because as the resin density is raised to improve or decrease the WVTR (leading to a lower water vapor transmission value), at least some physical properties of a film or container manufactured from the higher density materials will generally be poorer than those of a film or container produced by lower density materials. These poorer physical properties can manifest themselves in, for instance, increased splittiness or lack of balance in tear properties of a film, or greater tendency for crack propagation in a container. Accordingly, package designers and converters would generally like to have improved physical properties at the same or similar WVTR, or in the alternative, improved WVTR at similar densities. Alternatively, these designers or converters could, by utilizing films or containers made from the resins of an embodiment of the present invention, have lower (better) WVTR, than from resins previously obtainable (with both resins having the same or similar densities).

Applications for which such high density products can be used include films for cookie and cracker packaging. In these particular cases, the object of the package is not only to hold the contents, but also to provide resistance to moisture vapor transmission (from the environment to inside the package) which would diminish the shelf life of the contained cookies, crackers, or the like, where the shelf life is determined by the time it takes the products to pick up sufficient moisture to render them stale. In cookie and cracker packaging applications for example the general object of the barrier layer is to substantially keep moisture out or to slow its ingress.

In other types of packaging applications, pouches and pails, where the contained material is hygroscopic, for instance, detergent powders, the same function of slowing ingress of moisture is generally performed. On the other hand, there are also packaged products which contain moisture and which if reduced in moisture-content through, for instance, evaporation to the atmosphere, would destroy or impair the function of the contained products. In all of these cases the package is depended upon to prevent the transmission of water vapor in one direction or the other.

Copending application U.S. Ser. No. 08/093,501 discloses metallocene catalyst systems that can be used to produce polymers having not only excellent strength, sealing, and optical properties, but having superior water vapor transmission rates. The polymers are disclosed to have use in the packaging industry. A film is disclosed having at least one layer having a density less than about 0.935 g/cm$^3$, a $M_w/M_n$ less than about 3, a CDBI greater than about 80%. The layer includes a resin having a density about 0.90 g/cm$^3$ and a WVTR of less than about 2.25 g/mil/100 in$^2$/day.

In the past, higher density polyethylenes were needed to achieve a certain WVTR, alternatively a second layer could be used to provide other properties, often relatively poor in HDPE; for instance, physical properties such as tear resistance, and/or mechanical properties such as heat seal, not generally available from such a HDPE. However, such combinations may result in added costs and may effect other important properties necessary to the packaging industry. Therefore, a need exists for a barrier polymer from which a film or container can be fabricated such that the fabricated article will have relatively low water vapor transmission rates combined with improved physical properties.

SUMMARY OF THE INVENTION

It has been discovered that certain metallocene catalyst systems can be used to produce polyethylenes which when converted into films, sheets, or containers having not only excellent physical properties, such as balanced tear resistance and higher dart drop impact, but also having superior water vapor transmission rates as well. These polymers or barrier polymers of the invention are particularly well suited for use in the packaging industry, specifically in those applications in which the combination relatively low water vapor transmission rates and improved physical properties are desirable.

In certain embodiments of my invention a polyethylene resin comprises at least one layer of a film or container or is a constituent of such layer. This layer has a density in the range of from about 0.935 to about 0.965 g/cm$^3$, a $M_w/M_n$ less than about 3, a $M_z/M_w$ less than about 2.5, a $M_{z+1}/M_w$ less than about 4, and an article made using the resin has a water vapor transmission rate up to about 0.54 g/mil/100 in$^2$/day, preferably up to about 0.4 g/mil/100 in$^2$/day; the resin will elute volatiles including <$C_{20}$ (determined on GC/MS chromatography) of less than about 100 wppm; and a hexadecene volatiles level of less than 10 wppm. The film or container will have either a single layer or multilayer construction and the resin can be coextruded, laminated or blended with other materials.

BRIEF DESCRIPTION OF THE DRAWINGS

The foregoing aspects, features and advantages of the present invention will become clearer and more fully understood when the following detailed description, appended claims are read in conjunction with the accompanying drawings, in which:

FIG. I illustrates water vapor transmission rates as a function of film thickness comparing films of certain versions of this invention made with metallocene catalysts with films made from resins produced by traditional Ziegler-Natta catalysts.

Figure 1:
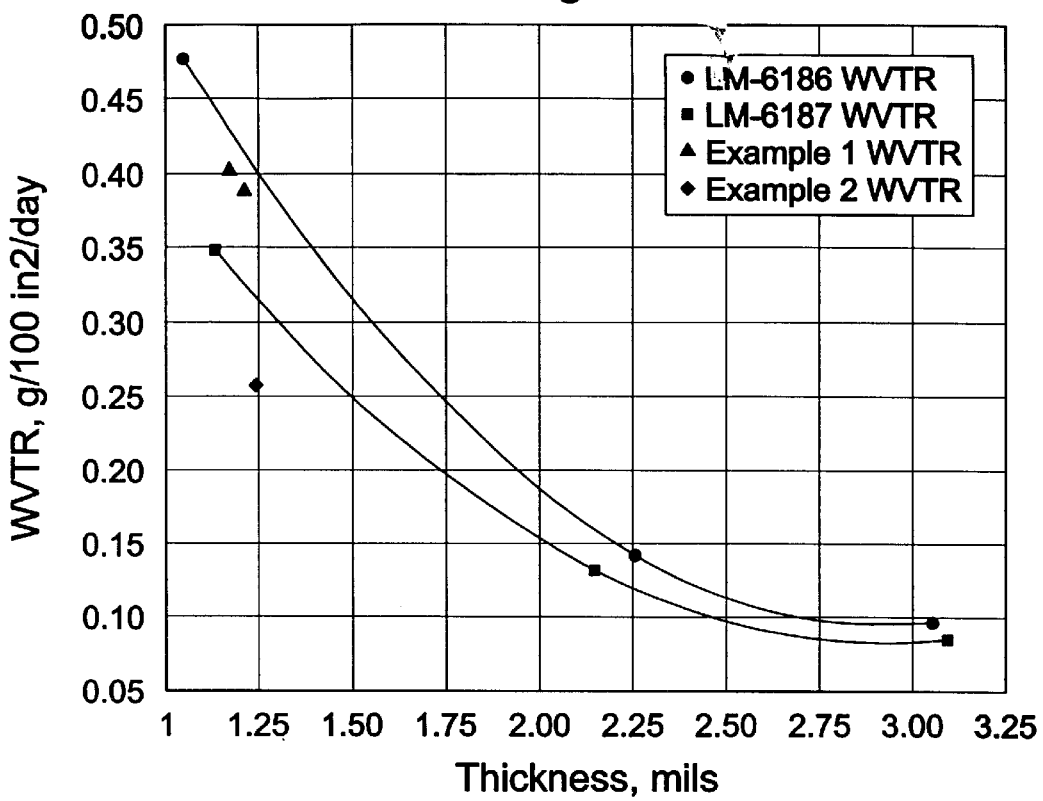
Figure 2:
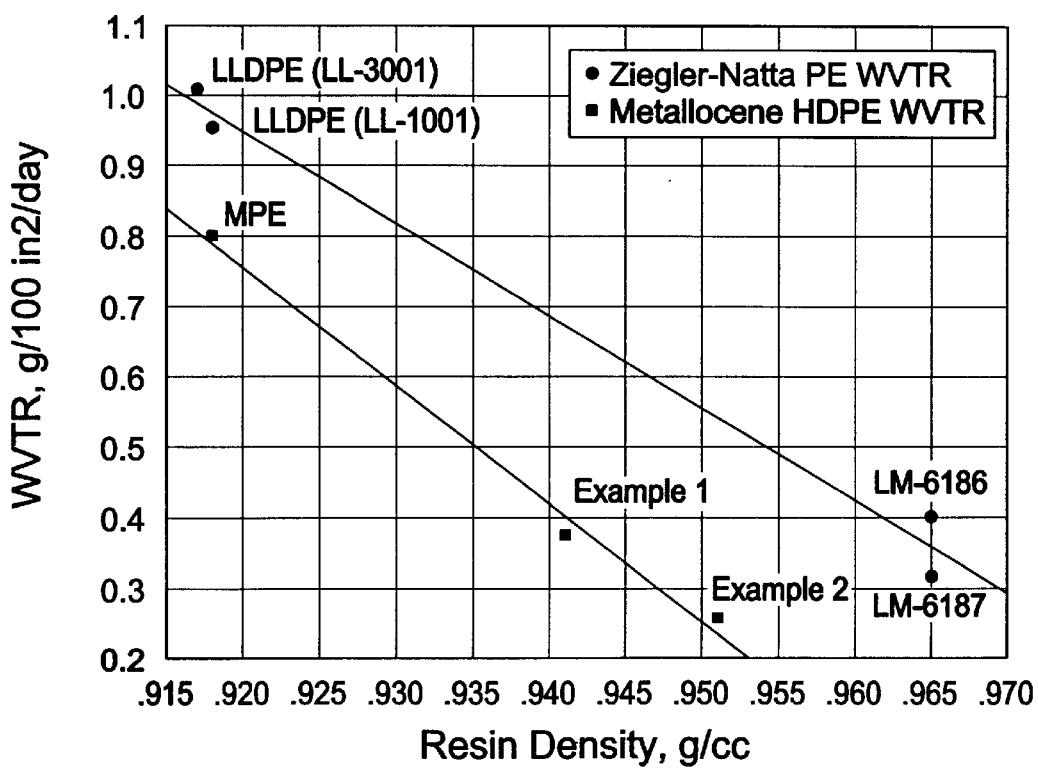

FIG. II illustrates WVTR as a function of density for both conventional Ziegler-Natta catalyzed resins converted into film, and metallocene-catalyzed resins (a version of this invention) converted into film. [Note LL-3001 and LL-1001 are conventional Ziegler-Natta catalyzed low density polyethylenes available from Exxon Chemical Company. "MPE" is metallocene-catalyzed linear polyethylene with a density of 0.918 g/cm³ (an experimental resin).]

DETAILED DESCRIPTION OF THE INVENTION

Introduction

This invention concerns certain high density polyethylene polymers, their production into fabricated articles such as film, containers, articles made from such films and containers, and applications in which such articles having relatively low water vapor transmission rates combined with good physical properties are desirable. These resins have unique properties particularly well suited for use in producing certain classes of polymeric films, film composites, bags or pouches made from the film, containers and articles made therefrom.

Principally, these resins and articles made from them are used in packaging applications, specifically those applications requiring good water vapor transmission rates, for example, food and chemical packaging. The resulting films or containers have combinations of properties rendering them superior to films or containers, previously available.

In an embodiment of my invention the resins, when converted into films or containers would surprisingly and unexpectedly have low water vapor transmission rates for a given density when compared to a film or container made from a resin previously available at the same or similar densities. Following is a detailed description of certain preferred polymers, films, or containers made from these polymers, and articles made from the films or containers, within the scope of the present invention. Also disclosed are preferred methods of producing theses polymers and preferred applications of these polymers. Those skilled in the art will appreciate that numerous modifications to these preferred embodiments can be made without departing from the scope of the invention. For example: Though the properties of the polymer are exemplified in film applications, they will have numerous other uses. To the extent my description is specific, it is solely for the purpose of illustrating preferred embodiments of my invention and should not be taken as limiting the present invention to these specific embodiments.

I have discovered that certain metallocene catalyst systems produce polymer resins that are highly desirable for use in certain film and container applications. Generally, these resins have a narrow molecular weight distribution and narrow composition distribution, compared to polymers produced from conventional Ziegler-Natta, or chromium based catalysts.

It will be appreciated by those of ordinary skill in the art that the polyethylene resins of certain embodiments of the present invention, can be combined with other materials, depending on the intended function of the resulting film or container, composition or structure, or packages made from such films or containers. As an example of such combinations, blown films of high density polyethylene having an ethylene vinyl acetate heat sealable coating can be used for food packaging. Such heat seal layers can be applied by any known manner to the high density polyethylene. For example the heat seal layer can be applied or formed, by extrusion coating, coextrusion coating, or by coextrusion of the high density material with a heat seal material or materials. Other types of heat seal materials include but are not limited to ethylene copolymers with monomers of vinyl acetate, ethylenically unsaturated acrylic acid esters such as ethylacrylate, butylacrylate, methylacrylate, and/or acrylic acid, methacrylic acid, terpolymers including combinations of these monomers, ionomers, lower density (below 0.935 g/cm³) ethylene α-olefin co or terpolymers (such as VLDPE, ULDPE and plastomers) and combinations thereof.

Other methods of improving WVTR and/or improving physical properties of the film or container may be used in addition to use of the resins described herein without departing from the intended scope of my invention. For example, including additives to improve the WVTR, such as wax and/or hydrocarbon resins, is not excluded by the present invention. Also, it is well known that manipulation of a film by changing quench conditions during melt processing and/or orienting the film, either monoaxially or biaxially, and/or by irradiating the film will have an effect on WVTR and/or physical properties. Such mechanical or other treatment or manipulation is not excluded by this invention.

Films or containers employing the resins of certain embodiments of the present invention can be oriented, annealed, or crosslinked just as may be done with films or containers from previously available resins. Additionally, the resins of the present invention can be made into film by processes including blown or cast film manufacturing techniques. Containers may be made by injection molding, blow molding, extrusion blow molding, thermoforming and the like. In such extrusion processes, the resins of the present invention can form a single layer film or container, or one layer of a multi-layer film or container. Alternatively, the resins of the present invention can be formed or utilized in the processes disclosed above where the resins are included in a blend where blend components well known to those in the industry. The blend components can function to modifiy barrier, opacity, sealing, cost, or other functions that will be known to those of ordinary skill in the art. The resin of the present invention may also be included in extrusion coated or laminated structures.

The films or composite structures are often used to package foods such as crackers, cookies, salted snacks, meat, cheese, deli items; and alternatively household cleaning compounds or industrial cleaning compounds such as dishwashing compounds, laundry compounds, bleach, floor cleaning and waxing compounds, glass cleaning compounds, abrasive cleaners, and combinations thereof Such cleaning compounds or products may be liquids, slurries, powders and the like.

Production of the Resins

The Catalyst Used in the Production of the Resins

The polyethylene resins used in this invention are preferably produced using a supported metallocene catalyst. Metallocene catalysts are typically those bulky ligand transition metal compounds derivable from the formula:

where L is a bulky ligand; A is at least one halogen leaving group, M is a transition metal and m and n are such that the total ligand valency corresponds to the transition metal valency. Preferably the catalyst is four coordinate such that the compound is ionizable to a 1+ valency state.

The ligands L and A may be bridged to each other, and if two ligands L and/or A are present, they may be bridged. The metallocene compound may be full-sandwich compounds having two or more ligands L which may be cyclopentadienyl ligands or cyclopentadiene derived ligands or half-sandwich compounds having one ligand L, which is a cyclopentadienyl ligand or derived ligand.

The metallocene compounds contain a multiplicity of bonded atoms, preferably carbon atoms, forming a group which can be cyclic. The bulky ligand can be a cyclopentadienyl ligand or cyclopentadienyl derived ligand which can be mono- or poly-nuclear or any other ligand capable of η-5 bonding to the transition metal. One or more bulky ligands may be π-bonded to the transition metal atom. The transition metal atom may be a Group 4, 5, or 6 transition metal and/or a transition metal from the lanthanide and actinide series. Other ligands may be bonded to the transition metal, such as at least one halogen as a leaving group that is detachable from the transition metal. Non-limiting examples of metallocene catalysts and catalyst systems are discussed in for example, U.S. Pat. Nos. 4,530,914, 5,124,418, 4,808,561, 4,897,455 all of which are herein fully incorporated by reference. Also, the disclosures of EP-A-0129,368, EP-A-0520732, EP-A-0277003, EP-A-0277004, EP-A-0420436, WO 91/04257, WO 92/00333, WO 93/08221, and WO 93/08199 are all fully incorporated herein by reference.

Various forms of the catalyst system of the metallocene type may be used in the polymerization process of this invention. Exemplary of the development of metallocene catalysts in the art for the polymerization of ethylene is the disclosure of U.S. Pat. No. 4,871,705 to Hoel, U.S. Pat. No. 4,937,299 to Ewen, et al. and EP-A-0 129 368 published Jul. 26, 1989, and U.S. Pat. Nos. 5,017,714 and 5,120,867 to Welborn, Jr. all of which are fully incorporated herein by reference. These publications teach the structure of the metallocene catalysts and include alumoxane as the cocatalyst. There are a variety of methods for preparing alumoxane; one of which is described in U.S. Pat. 4,665,208 incorporated herein by reference.

Further, the metallocene catalyst component of the invention can be a monocyclopentadienyl heteroatom containing compound. This heteroatom is activated by either an alumoxane alone or an alumoxane and an ionic activator to form an active polymerization catalyst system to produce polymers useful in this present invention. These types of catalyst systems are described in, for example, PCT International Publications WO 92/00333, WO 94/07928, and WO 91/04257, U.S. Pat. Nos. 5,057,475, 5,096,867, 5,055,438 and 5,227,440 and EP-A-0 420 436, all of which are fully incorporated herein by reference. In addition, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems may be those described in U.S. Pat. No. 5,064,802 and PCT publications WO 93/08221 and WO 93/08199 published Apr. 29, 1993 all of which are herein incorporated by reference.

The preferred transition metal components of the catalyst of the invention are those of Group 4, particularly, zirconium, titanium and hafnium. The transition metal may be in any oxidation state, preferably +3 or +4 or a mixture hereof All the catalyst systems of the invention may be prepolymerized or used in conjunction with an additive or scavenging component to enhance catalytic productivity.

For purposes of this patent specification the term "metallocene" is defined to contain one or more unsubstituted or substituted cyclopentadienyl or cyclopentadienyl moiety in combination with a transition metal. In one embodiment the metallocene catalyst component is represented by the general formula $(C_p)_m MeR_n R'_p$ wherein at least one $C_p$ is an unsubstituted or, preferably, a substituted cyclopentadienyl ring even more preferably a monosubstituted cyclopentadienyl ring; Me is a Group 4, 5 or 6 transition metal; R and R' are independently selected halogen, hydrocarbyl group, or hydrocarboxyl groups having 1–20 carbon atoms; m=1–3, n=0–3, p=0–3, and sum of m+n+p equals the oxidation state of Me.

In another embodiment the metallocene catalyst component is represented by the formulas:

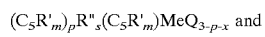

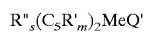

wherein Me is a Group 4, 5, 6 transition metal, $C_5R'_m$ is a substituted cyclopentadienyl, each R', which can be the same or different is hydrogen, alkyl, alkenyl, aryl alkylaryl or arylalkyl radical having from 1 to 20 carbon atoms or two carbon atoms joined together to form a part of a $C_4$ to $C_{20}$ ring, R" is one or more of or a combination of a carbon, a germanium, a silicon, a phosphorous or a nitrogen atom containing radical bridging two $(C_5R'_m)$ rings, or bridging one $(C_5R'_m)$ ring back to Me, when p=0 and x=1, otherwise "x" is always equal to 0, each Q which can be the same or different is an aryl, alkyl, alkenyl, alkylaryl, or arylallyl radical having from 1 to 20 carbon atoms or halogen, Q' is an alkylidene radical having from 1–20 carbon atoms, s is 0 or 1 and when s is 0, m is 5 and p is 0, 1 or 2 and when s is 1, m is 4 and p is 1.

While any metallocene catalyst component can be used in the invention the monosubstituted metallocenes are preferred over the disubstituted. However, the disubstituted and polysubstituted metallocenes still are better than counterpart catalyst systems, such as Ziegler-Natta systems, produced in accordance with prior art methods. In a further embodiment the preferred metallocene catalyst component of the invention is represented by the formulas:

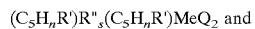

wherein Me is a Group 4, 5, 6 transition metal, each R', which can be the same or different, is hydrogen, alkyl, alkenyl, aryl, alkylaryl or arylalkyl radical having from 1 to 20 carbon atoms, R" is one or more of or a combination of a carbon, a germanium, a silicon, a phosphorous or a nitrogen atom containing radical bridging two $(C_5H_4R')$ rings, each Q which can be the same or different is an aryl, alky, alkenyl, alkylaryl, or arylalkyl radical having from 1 to 20 carbon atoms or halogen, Q' is an alkylidene radical having from 1–20 carbon atoms; s is 0 or 1, when s=1, then n=3, when s=0, n=4.

In another embodiment the metallocene catalyst component is represented by the formula:

wherein Me is a Group 4, 5, 6 transition metal, each R', which can be the same or different, is hydrogen, alky, alkenyl, aryl, alkylaryl or arylalkyl radical having from 1 to 20 carbon atoms, R" is one or more of a combination of carbon, a germanium, a silicon, a phosphorous or a nitrogen atom containing radical bridging the ($C_5R'_m$) ring back to Me, each Q which can be the same or different is an aryl, alkyl, alkenyl, allylaryl, or arylalkyl radical having from 1 to 20 carbon atoms or halogen.

For the purposes of this patent specification, the terms "cocatalysts" and "activators" are used interchangeably and are defined to be any compound or component which can activate a bulky ligand transition metal compound or a metallocene, as defined above. It is within the scope of this invention to use, in addition to using alumoxane, ionizing ionic activators or compounds such as tri (n-butyl) ammonium tetra (pentafluorophenyl) boron, which ionize the neutral metallocene compound. Such ionizing compounds may contain an active proton, or some other cation associated with but not coordinated or only loosely coordinated to the remaining ion of the ionizing ionic compound. Such compounds and the Eke are described in EP-A-0520 732, EP-A-0 277 003 and EP-A-0 277 004, and U.S. Pat. Nos. 5,153,157, 5,198,401 and 5,241,025 and are all herein fully incorporated by reference.

For purposes of this patent specification the terms "carrier" and "support" are interchangeable and can be any support material, preferably a porous support material, capable of containing water, absorbed or adsorbed, such for example, talc, inorganic oxides, inorganic chlorides and resinous support materials such as polyolefin or polymeric compounds or other organic support materials.

The preferred support materials are inorganic oxide materials which include those from the Periodic Table of Elements of Groups 2, 3, 4, 5, 13 or 14 metal oxides. In a preferred embodiment the catalyst support material include silica, alumina, silica-alumina, and mixtures thereof Other inorganic oxides that may be employed either alone or in combination with the silica, alumina or silica-alumina are magnesia, titani, zirconia, and the like. Other suitable support materials can be employed such as, finely divided polyolefins, such as polyethylene or polymeric compounds and inorganic compounds such as magnesium dichloride and the like.

In accordance with this invention the support material preferably has a water content in the range of from about 3 weight percent to about 27 weight percent based on the total weight of the support material and water contained therein, preferably in the range of from about 7 weight percent to about 15 weight percent, and most preferably in the range of from about 9 weight percent to about 14 weight percent. The amount of water contained within the support material can be measured by techniques well known in the art, such as by loss on ignition (LOI).

Preparation of the Catalyst Used to Produce the Resins

In the method of making the preferred catalyst system of the invention, the support material is first contacted with a component capable of forming an activator for the metallocene catalyst component, as previously discussed.

In one embodiment, the preferred component is an organometallic compound of Group 1, 2, 3 and 4 organoretallic allyls, alkoxides, and halides. The preferred organometallic compounds are lithium alkyls, magnesium alkyls, magnesium alkyl halides, aluminum alkyls, silicon alkyl, silicon alkoxides and silicon alkyl halides. The more preferred organometallic compounds are aluminum allyls and magnesium alkyls. The most preferred organometallic compounds are aluminum alkyls, for example, triethylaluminum (TEAL), trimethylaluminum (TMAL), tri-isobutylaluninum (TIBAL) and tri-n-hexylaluminum (TNHAL) and the like.

The most preferred organometallic compounds are those that when contacted with the water containing support material of the invention form an oxy-containing organometallic compound represented by the following general formula:

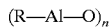

which is a cyclic compound and

which is a linear or non-cyclic compound and mixtures thereof including multi-dimensional structures. In the general formula R is a $C_1$ to $C_{12}$ alkyl group such as for example methyl, ethyl, propyl, butyl, pentyl , hexyl, octyl, nonyl and n is an integer from about 1 to 20. The most preferred oxy containing organometallic compounds are alumoxanes, for example methyl alumoxane and/or ethylalumoxane.

In the preferred embodiment the support material is introduced to a solution of an organometallic compound such that the temperature of the solution containing the organometallic compound remains substantially constant throughout the introduction of the support material such that the temperature is always within the temperature ranges described below.

Into a 1 liter flask equipped with mechanical stirrer, 180 ml of TMAL in heptane solution (15 wt %) and 90 ml of heptane were charged. The solution was cooled and maintained at a temperature of 45° F. (7.2° C.). A 40 g sample of silica gel (Davison D-948 with average particle size of 70 micron) which contained 12.5 wt % of water was slowly added into the flask over 70 minutes. The mole ratio TMAL/$H_2O$ was 0.91. Next, 0.9 g of (n-BuCp)$_2$ZrCl$_2$ was slurried in 20 ml of heptane and then added into the vessel. The mixture was allowed to react at 165° F. (74° C.) for 1 hour. At the end of the reaction, the solid was dried by nitrogen purging. A free flowing solid was obtained at the end of the preparation.

The Process Used to Produce the Resins

The resins used in the present invention preferably produced using a continuous slurry process. Such continuous, slurry polymerization processes are well known to those skilled in the art. A slurry polymerization process generally uses pressures in the range of about 1 to about 500 atmospheres and even greater and temperatures in the range of −60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be an alkane or cycloalkane, or an aromatic hydrocarbon such as toluene, ethylbenzene or xylene. The medium employed should be liquid under the conditions of polymerization and relatively inert. Preferably, hexane or isobutane is employed. Table I sets forth the operating parameters used in producing the polyethylene resin grades (Resin A and Resin B) of the present invention. Note that Resin A and Resin B contain a small amount of hexene comonomer. Those skilled in the art will appreciate that other polymerization processes may be used to produce the resins, such as gas-phase fluidized-bed polymerization and solution polymerization.

The comonomers can include butene not limited to α-olefins having 3 to 20 carbon atoms, 4 to 8 carbon atoms are preferred. Preferred α-olefins are 1-butene, 4-methyl-1-pentene, 1-hexene, and 1-octene, one or more of these comonomers may be added to the ethylene. If included in the HDPE, the monomers will be present up to about 6 mole percent, based on the total moles of copolymer, preferably up to about 3 mole percent.

Characteristics of the Resins

The films of this invention are also distinguishable from known films made from traditional Ziegler-Natta or chromium based resins on the basis of their molecular weight distribution or polydispersity index as represented by (the ratio of the weight average molecular weight ($M_w$) to the number average molecular weight ($M_n$)) $M_w/M_n$. The $M_w/M_n$ of the resins of the present invention is generally narrower than that of resins produced using traditional Ziegler-Natta or chromium type catalysts. The polydispersity index of the resins of the present invention are typically in the range of from about 1.5 to about 3, compared to a range of 3 and above for most known traditional Ziegler-Natta or chromium type catalyzed resins. In this regard the present resins are substantially different from many commercially available resins produced using these traditional Ziegler-Natta or chromium catalysts or catalyst systems. In addition, the tails of the molecular weight distribution curve for the resin described herein are considerably smaller than those of known Ziegler-Natta or chromium catalyzed polyethylenes. This distinction is readily apparent by comparing the ratio of $M_z/M_w$ ($M_z/M_w$ represents the ratio of the third moment of the molecular weight distribution curve (z average molecular weight) to the second moment) and $M_{z+1}/M_w$ ($M_{z+1}/M_w$ represents the ratio of the fourth moment ($_{z+1}$ is the fourth moment of the molecular weight distribution curve) to the second moment). Utilizing the present invention, resins can be produced with an $M_z/M_w$ less than about 2.5, usually less than about 2.0 and most typically in the range of from about 1.4 to about 1.9. In contrast, the ratio of $M_z/M_w$ for Ziegler-Natta catalyzed resins is typically above 2.5. Similarly, the value of $M_{z+1}/M_w$ for the present resins is less than about 4.0, usually less than about 3.0 and most typically in the range of from about 2.0 to about 3.0. For Ziegler-Natta catalyzed resins $M_{z+1}/M_w$ is generally higher, typically above 4.0. Table I provides further data regarding $M_z$, $M_w$, $M_{z+1}$ for the resins of this invention and also for some commercially available resins.

Those skilled in the art will appreciate that there are several methods available for determining the molecular weight distribution of a polyethylene sample. For the purpose of Table I and other references to $M_w$, $M_z$ and $M_{z+1}$ given in this application and the appended claims, molecular weight distribution is determined with a Waters Gel Permeation Chromatography equipped with ultrastyro gel columns operated at 145° C. Trichlorobenzene is used as the eluting solvent. The calibration standards are sixteen polystyrenes of precisely known molecular weight, ranging from a molecular weight of 500 to a molecular weight of 5.2 million. NBS 1475 polystyrene was also used as a calibration standard.

The volatiles of high density polyethylenes and films and containers made from them are of importance in food packaging applications generally from an odor and/or taste perspective, known as organoleptics.

Tests for determining the volatiles may be run using analytical equipment and methods outlined in the Examples below. Analysis is accomplished by short path thermal desorption (SPTD) Gas Chromatography/Mass Spectroscopy (GC/MS).

Typical levels of volatiles are shown in Table 1.

The present invention metallocene-catalyzed high density polyethylenes display <$C_{20}$ volatiles of less than 25% of those of the comparative (Z-N) polyethylenes. Additionally, the hexadecene levels of the present invention resins are less than 25% of those generally found in traditionally Z-N catalyzed polyolefins. The <$C_{20}$ (GC/MS) levels in films or containers of the inventive resin will be generally less than about 100 wppm, preferably less than about 75 wppm, more preferably less than about 60 wppm. The hexadecene (GC/MS) levels in films or containers will generally be less than about 12 wppm, preferably less than about 10 wppm, more preferably less than about 7.5 wppm, most preferably less than about 5 wppm.

The melt index of the resins of the invention are generally in the range of 0.01 to 100 dg/min, preferably 0.02 to 50 dg/min, more preferably 0.1 to 20 dg/min and even more preferably 0.5 to 10 dg/min.

Properties of Films Produced from the Resins

The resins produced using the metallocene catalyst described above are in many applications markedly superior to commercially available products. These resins are particularly useful in film applications. Table I sets forth the properties of films (Examples 1 and 2) of the present invention (metallocene-catalyzed HDPE resins) and compares these properties to the corresponding properties of films produced using commercially available resins (Examples 3 and 4) derived from conventional Ziegler-Natta catalysts.

In one embodiment of the present invention certain films and other fabricated articles have higher water vapor transmission resistance than comparable articles made from traditional Ziegler-Natta produced materials at the same or similar density. This can be seen in FIG. II which plots WVTR as a function of film density. Also of interest, are the curves of WVTR for various films as a function of film thickness (FIG. II). For the purposes of this patent specification WVTR tests were performed on a MOCON permatron developed by Modem Controls, inc. using ASTMF 372–73 at 100° F. (378° C.) and 100% relative humidity.

The WVTR's of the films of an embodiment of the invention are generally up to about 0.54 g/mil/100 in$^2$/day. Preferably up to 0.50 g/mil/100 in$^2$/day. More preferably up to about 0.4 g/mil/100 in$^2$/day. Most preferably up to about 0.35 g/mil/100 in$^2$/day. This particular attribute is most pronounced in films having a densities greater than about 0.935 g/cm$^3$, preferably greater than about 0.940 g/cm$^3$. In one embodiment the WVTR for the films of this invention are represented by the following general empirical formula derived from FIG. II. Metallocene catalyzed resins of the present invention:

WVTR (g/mil/100 in$^2$/day)=16.224–16.881 (resin density (g/cm$^3$)). Ziegler-Natta catalyzed resins:

WVTR (g/mil/100 in$^2$/day)=13.013–13.115 (resin density).

It is not beyond the scope of the invention to blend or coextrude the resins of the films of the invention with other materials such as linear polyethylenes (HDPE, MDPE, LLDPE), low density polyethylene (LDPE), polypropylene (PP) (homopolymers and copolymers), polybutene (PB), ethylene vinyl acetate (EVA), and the like to fabricate useful articles. The films of the invention include blown or cast films in mono-layer or multilayer constructions formed by coextrusion or lamination. The HDPE resin described by the present invention may be produced by mixed catalysts, may be resins blended in a reactor, or may be blended in post-reactor operations.

The resin and product properties recited in this specification were determined in accordance with the following test procedures. Where any of these properties is referenced in the appended claims, it is to be measured in accordance with the specified test procedure.

| Property | Units | Procedure |
|---|---|---|
| Melt Index | dg/min | ASTM D-1238(E) |
| Density | g/cc | ASTM D-1505 |
| Tensile @ Yield | psi | ASTM D-882 |
| Elongation @ Yield | % | ASTM D-882 |
| Tensile @ Break | psi | ASTM D-882 |
| Elongation @ Break | % | ASTM D-882 |
| 1% Secant Modulus | kpsi | ASTM D-882 |
| Dart Impact Strength | g/mil | ASTM D-1709–75, method A |
| Elmendorf Tear Resistance | g/mil | ASTM D-1922*–85 |
| Total Energy Impact | ft-lb | ASTM D-4272 |
| Water Vapor Transmission Rate | g mil/100 in$^2$/day | ASTM F 372–73 |

*Lowest reading, not average.

While the present invention has been described and illustrated by reference to particular embodiments thereof it will be appreciated by those of ordinary skill in the art that the invention lends itself to variations not necessarily illustrated herein. For example, it is not beyond the scope of this invention to include additives with the claimed films or containers or to blend or coextrude resins to form the claimed films or containers with other polymers or even laminate the claimed films to other materials such as metal foils, paper, other polymer films and combinations thereof For this reason, then, reference should be made solely to the appended claims for purposes of determining the true scope of the present invention.

EXAMPLES

Example I

HDPE films are made utilizing the following conditions, materials and equipment:

| | |
|---|---|
| Extruder: | 2½ inch Egan blown film line 60 mil die gap, 6 inch Uniflow ® die and air ring |
| Extruder Conditions: Examples 1 and 2 inventive examples: | 93 lb/hr, blow up ratio (BUR) 2:2 |
| Example 1: | 2.0 dg/min. MI 0.941 g/cm$^3$ density |
| Example 2: | 0.75 dg/min. MI 0.951 g/cm$^3$ density |

Examples 1 and 2 made according to the description of the present invention.

| | |
|---|---|
| Example 3: | LM 6186-00 (Quantum Chemical Co.) 0.80 dg/min. MI 0.960 g/cm$^3$ density |

-continued

| | |
|---|---|
| Example 4: | LM 6187-00 (Quantum Chemical Co.) 1.15 dg/min. MI 0.960 g/cm$^3$ density |

GC/MS Experimental:

Thermal Desorption—Direct Liquid—Purge and Trap GC/MS

Trace levels of volatile organics in polyolefins can be measured to low part per billion (ppb) levels using the various sampling methods available with Gas Chromatography using Mass Spectrometer (GC/MS) as a detector. Samples are introduced to the GC using thermal desorption sampling techniques.

Short Path Thermal Desorption Sampling—The short path thermal desorption instrument (Short Path Thermal Desorption Model TD-2/Scientific Instrument Services Inc.) passes carrier gas over the heated sample, which strips volatile organics from the polymer matrix and deposits them directly on the column. The first step in the thermal desorption sampling process is a cleaning step. Each sampling tube (3/16" id×4" long metal tube is loaded with a glass wool plug) is heated to 300° C. to bake off any volatile contaminants. Next, the tube is charged with a polymer sample which will vary in size depending on the analysis (50 mg is a typical size). Then the sample is purged with the Helium carrier gas for 2 min. to eliminate oxygen from the tube. This is necessary to prevent oxidative degradation of the sample during the desorption process. Finally, the sample is heated to a desorption temperature of 250° C. for 10 min. while carrier is passing over the sample and onto the column. The volatiles stripped from the polymer are concentrated (focused) at the head of a cryogenically cooled GC column.

GC Equipment and Conditions:

The GC employed for these analyses is a Hewlett-Packard 5890 GC (cryogenic oven) for GC/MS. For a typical analysis the GC injector is heated to 275° C. The oven program is −50° C. (0 min), ramp rate=5° C./min., the final temperature is 300° C., the final temperature was held for 15 min. The volatiles are separated according to their boiling points using a DB-5MS capillary column (30 m×0.25 mm×1 um)/J & W Scientific.

Mass Spectrometer Equipment and Operation:

Mass Spectrometric detection is performed using Hewlett-Packard 5970B MSD. The MS is operated in full spectrum mode for all general analyses. The identity of elutes $\leq C_{20}$ was determined by comparison with a normal hydrocarbon boiling point standard. Response factors used for quantification were determined from the normal hydrocarbon boiling point standard.

Test procedures: the tests disclosed above were used to obtain the results shown on Table I. As can be seen from Table I, Example 1 has improved Dart Drop Impact resistance, more balanced Elmendorf Tear (MD/TD closer to 1) than comparative Examples 3 and 4 while the WVTR is substantially the same. Also of note is that Examples 1 and 2 at lower densities have superior WVTR than the higher density comparative examples (Examples 3 and 4).

TABLE I

| Sample Identification | Example 1 | Example 2 | Comparative Example 3 | Comparative Example 4 |
|---|---|---|---|---|
| Material | M-HDPE | M-HDPE | LM 6186-00 | LM 6187-00 |
| Resin Density, g/cm³ | 0.941 | 0.951 | 0.96+ | 0.96+ |
| Film Density, g/cc | 0.937 | 0.942 | — | — |
| WVTR (g/mil/100 in²/day) | 0.47 | 0.32 | 0.50 | 0.39 |
| Tensile | | | | |
| Tensile @ Yield (psi) | | | | |
| MD | 2.8 | 3.5 | — | — |
| TD | 3.0 | 4.6 | — | — |
| Ultimate Tensile (kpsi) | | | | |
| MD | 5.3 | 9.0 | 4.5 | 4.6 |
| TD | 5.0 | 7.3 | 3.7 | 3.6 |
| Elongation @ Yield (%) | | | | |
| MD | 5 | 5 | | |
| TD | 5 | 5 | | |
| Break Elongation (%) | | | | |
| MD | 610 | 590 | 410 | 490 |
| TD | 667 | 760 | | |
| 1% Secant (kpsi) | | | | |
| MD | 94 | 121 | 145 | 141 |
| TD | 99 | 189 | 183 | 169 |
| Haze | 35.7 | 11.6 | — | — |
| Internal Haze | 11.0 | 5.6 | — | — |
| Gloss | 28 | 62 | — | — |
| TE Impact @ RT (ft-lbs) | 0.50 | 0.33 | — | — |
| Gauge (mils) | 1.25 | 1.16 | 1.5 | 1.5 |
| Average Elmendorf Tear (g/mil) | | | | |
| MD | 31 | 20 | 13.3 | 13.3 |
| TD | 54 | 363 | 233 | 133 |
| Dart Drop (g/mil) | 49 | — | 32 | 46 |
| Melt Index, g/10 min. | 2.0 | 0.78 | 0.80 | 1.15 |
| Volatiles @ 250° C. | | | | |
| <C₂₀ (* WPPM) | 57.4 | 57.4 | — | 244.7 |
| hexadecene (WPPM) | 2.6 | 4.1 | — | 19.2 |
| HLMI (dg/min) | 32 | 13.4 | — | — |
| MIR | 15.8 | 17.2 | — | — |
| $M_w$ | 87,700 | 118,100 | — | — |
| $M_n$ | 38,700 | 46,500 | — | — |

* (parts per million by weight)

I claim:

1. A food covered with a film said film comprising at least one layer, said film including an ethylene polymer, said ethylene polymer having a density in the range of from about 0.935 g/cm³ to about 0.965 g/cm³ and a WVTR up to about 0.54 g/100 in²/24 hrs./mil; wherein said ethylene polymer has an $M_z/M_w$ less than about 2.5, said ethylene polymer having volatile levels not exceeding 100 wppm of <$C_{20}$, and not exceeding 10 wppm of hexadecene.

2. The food of claim 1 wherein said ethylene polymer has a density in the range of from about 0.935 g/cm³ to about 0.955 g/cm³, a WVTR up to about 0.4 g/100 in²/24 hrs/mil, wherein said ethylene polymer has a $M_z/M_w$ less than about 2.0.

3. The food of claim 1 wherein said ethylene polymer has a density in the range of from about 0.935 g/cm³ to about 0.945 g/cm³, a WVTR up to about 0.5 g/100 in²/24 hrs/mil, wherein said ethylene polymer has a $M_z/M_w$ less than about 2.0.

4. The food of claim 2 or 3 wherein said ethylene polymer is a copolymer of ethylene and an α-olefin, said α-olefin present in said copolymer up to about 6 mole percent based on the total moles of said ethylene polymer, and wherein said α-olefin is selected from the group consisting of 1-butene, 4-methyl-1-pentene, 1-hexene, 1-octene, and 1-decene.

5. The food of claim 1 wherein said film has a $M_z/M_w$ in the range of from about 1.4 to about 1.9, wherein said film has as $M_{z+1}/M_w$ in the range of from about 2 to about 3, wherein said film has volatiles of a <$C_{20}$ component less than about 75 wppm, and a hexadecene component less than about 7.5 wppm.

6. The food of claim 1 wherein said film has a $M_z/M_w$ less than about 3, a $M_z/M_w$ less than about 2.0, a volatiles level of <$C_{20}$ less than about 60 wppm and a volatiles level of hexadecene less than about 5 wppm, wherein said film has a water vapor transmission rate less than about 0.54 g/mil/100 in²/day.

7. The food of claim 1 wherein said film is a multi-layer film.

8. The food of claim 7 wherein said multi-layer film includes a heat seal layer.

9. The food of claim 8 wherein said heat seal layer is selected from the group consisting of ethylene vinyl acetate, ethylene ethyl acrylate, ethylene methyl acrylate, ethylene butyl acrylate and combinations thereof.

10. A food consisting essentially of:

a) a food; and b) a package covering and in contact with said food, said package including a polyethylene, said polyethylene having:

i) a density in the range of from about 0.935 g/cm³ to about 0.965 g/cm³;

ii) a WVTR up to about 0.54 g/m²/24hr/mil;

iii) a $M_w/M_n$ up to about 3;

iv) a $M_z/M_w$ less than about 2;

v) a $M_{z+1}/M_w$ in the range of from about 1.4 to about 1.9;

vi) a <$C_{20}$ volatiles content less than about 75 wppm; and vii) a hexadecene volatiles content less than about 7.5 wppm.

* * * * *